(12) United States Patent
Kayanakis et al.

(10) Patent No.: US 6,497,371 B2
(45) Date of Patent: Dec. 24, 2002

(54) CONTACTLESS ACCESS TICKET AND METHOD FOR MAKING SAME

(75) Inventors: Georges Kayanakis, Antibes (FR); René Rose, Nimes (FR)

(73) Assignee: Ask S.A., Sophia Antipolis (FR)

( * ) Notice: Subject to any disclaimer, the term of this patent is extended or adjusted under 35 U.S.C. 154(b) by 0 days.

(21) Appl. No.: 09/799,700

(22) Filed: Mar. 7, 2001

(65) Prior Publication Data

US 2002/0127423 A1 Sep. 12, 2002

Related U.S. Application Data

(63) Continuation of application No. PCT/FR00/01959, filed on Jul. 7, 1999.

(30) Foreign Application Priority Data

Jul. 7, 1999 (FR) ............................................. 99 08802

(51) Int. Cl.[7] .............................................. G06K 19/06
(52) U.S. Cl. ........................ 235/492; 235/380; 235/488; 428/195
(58) Field of Search ................................ 235/492, 487, 235/488, 451, 486; 283/81

(56) References Cited

U.S. PATENT DOCUMENTS 5,662,976 A * 9/1997 Popat ........................ 428/40.1
5,888,624 A 3/1999 Haghiri et al. .............. 428/195
6,214,155 B1 * 4/2001 Leighton ..................... 156/298
6,375,083 B2 * 4/2002 Fries et al. .................. 235/492

FOREIGN PATENT DOCUMENTS

| DE | 44 03 513 | | 8/1995 | |
|----|-----------|---|--------|---|
| DE | 198 45 296 | | 3/2000 | |
| EP | 595 549 | | 5/1994 | |
| EP | 615 285 | | 9/1994 | |
| JP | 06336096 A | * | 6/1994 | ........... B42D/15/10 |
| WO | 97/42598 | | 11/1997 | |
| WO | WO 98/320099 | * | 7/1998 | ......... G06K/19/077 |

* cited by examiner

Primary Examiner—Karl D. Frech
Assistant Examiner—Daniel A. Hess
(74) Attorney, Agent, or Firm—James C. Lydon

(57) ABSTRACT

A ticket providing access to a zone with controlled access when it is presented without contact in front of a scanner authorizing access to the zone, the ticket having an Edmonson format and including a paper ticket body covered on both surfaces with a protective coating. The paper ticket body is provided with a through recess where is located an electronic module including an integrated circuit and an antenna. The latter is formed by at least one turn obtained by screen printing with silvery powder in a polymerisable composition before being heat-cured. The ticket provides the advantages of being inexpensive to produce compared to a contactless access card and is highly biodegradable, which is essential for a disposable ticket.

9 Claims, 3 Drawing Sheets

CONTACTLESS ACCESS TICKET AND METHOD FOR MAKING SAME

This application is a continuation of International application PCT/FR00/01959, filed Jul. 7, 1999 and published on Jan. 18, 2001 in the French Language.

TECHNICAL FIELD

The present invention relates to the access to zones with controlled access in which a contactless access support is used in a controlled zone, and relates particularly to a disposable contactless ticket and its manufacturing process.

BACKGROUND ART

The access media providing access to zones with controlled access in public transport networks such as the French RATP subway or SNCF railway networks increasingly use "contactless" techniques as opposed to standard contact-type media. The latter must be inserted into a ticket reader to make the contact enabling the validity of the support to be checked. Over time, the ticket reader's brushes become dirty resulting in a lack of contact which requires the user to execute the operation several times, resulting in a significant loss of time.

The exchange of information between a contactless medium and the ticket reader is generally accomplished by remote electromagnetic coupling between the first antenna provided within the contactless medium and a second antenna located in the ticket reader. Furthermore, the support is equipped with an electronic module featuring the first antenna connected to a semi-conducting disk or chip which contains, among other components, a radio-frequency (RF) part, a memory in which the information to be provided to the ticket reader is stored and the logical functions required to compile the information to be transmitted and to process the information received.

There are, in fact, two groups of transport network users, the permanent users and the occasional users. For the first group, the ISO format contactless smart card is the best solution insofar as the cost of the card distributed over the total number of trips made over a long period of time will always remain low for the user. But the cost of the card becomes excessive in relation to the cost of the trip for the second group made up of occasional users who would be required to buy a card for a single trip.

SUMMARY OF THE INVENTION

This is why one of the objects of the invention is to supply a medium providing access to a controlled access zone, such as a public transport network, in the form of a disposable ticket which is highly biodegradable and very inexpensive although featuring the same functionality as a contactless access card despite the small dimensions.

A second object of the invention is to provide a process for manufacturing a disposable contactless access ticket having the same functionality as a contactless access card despite the small dimensions.

The invention relates therefore to a ticket providing access to a zone with controlled access when it is presented without contact in front of a ticket reader authorizing access to the zone, said ticket having an Edmonson format and comprising a paper ticket body covered on both surfaces with a protective coating. The paper ticket body is provided with a through-hole wherein is an electric module comprising an integrated circuit and an antenna. The latter is formed by at least one turn obtained by screen printing with silvery powder in a polymerisable composition before being heat-cured.

Another object of the invention is a process for manufacturing contactless tickets consisting in preparing a paper strip or multi-band having a width corresponding to several ticket widths, to make the holes in the band designed to receive the electronic ticket modules, slice the band into several single strips, each corresponding to a reel of tickets, and consecutively placing on both sides, the first layer of protective coating then the second layer of protective coating after having installed the electronic modules in the holes.

According to a characteristic of the invention, an overlay having the same thickness as the integrated circuit and featuring a through-hole at the location of the integrated circuit is placed on the electronic module, and the electronic module covered by the overlay is hot-laminated to reduce the resistance of the antenna.

BRIEF DESCRIPTION OF THE FIGURES

The objects, characteristics and advantages of the invention will become more apparent from the following description when taken in conjunction with the accompanying drawings in which.

DETAILED DESCRIPTION OF THE INVENTION

Figure 1:
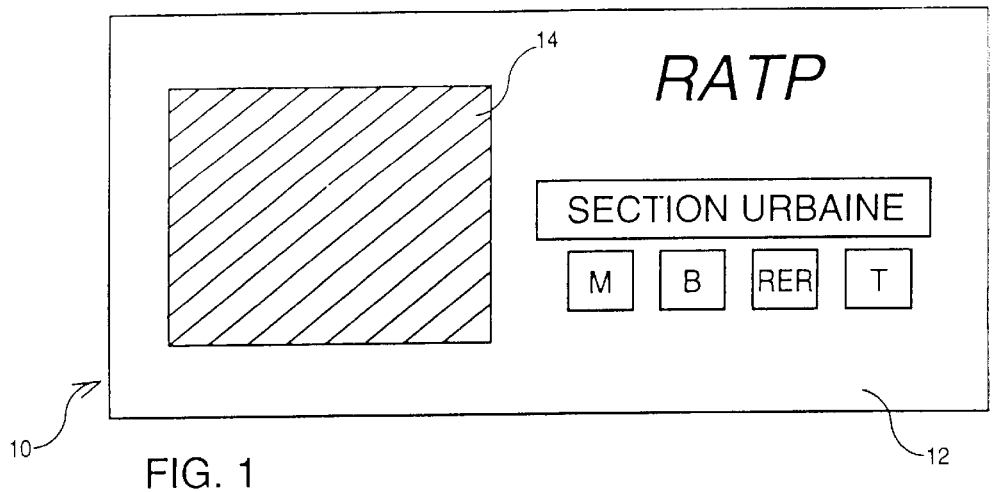
FIG. 1 represents the printed face of a ticket providing access to a public transport network according to the invention, FIG. 2 schematically represents a perspective view of a public transport ticket according to the invention.

A ticket 10 providing access to a zone with controlled access, such as that of the RATP subway network, is illustrated in FIG. 1. It features a ticket body 12 having an Edmonson format 67 mm×30 mm and an electronic module 14 comprising the electronic means necessary so that a user who presents the ticket in front of an adequate ticket reader can obtain access to the network, for example causing an automatic gate to open. The back face of the ticket body 12 features printed information such as graphics, logos (RATP), alphanumeric information, barcode, etc.

Figure 2:
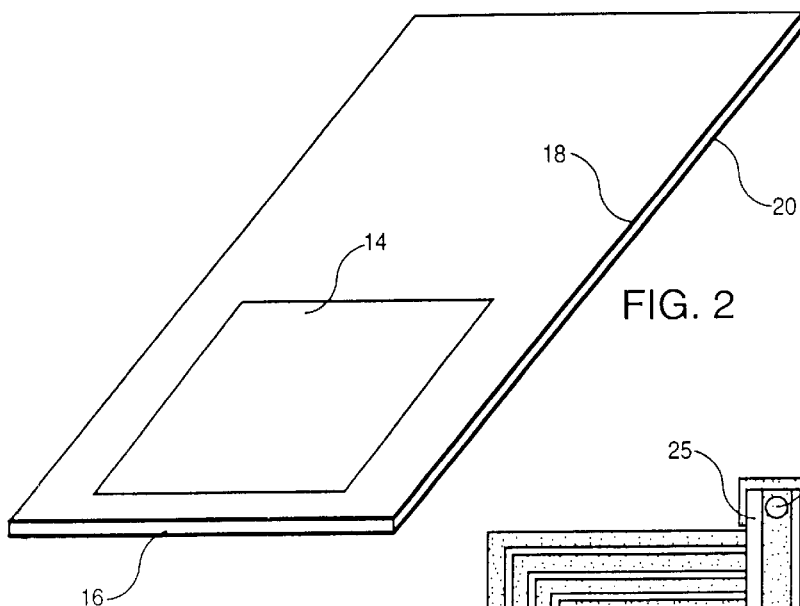

The ticket body, represented in a perspective view in FIG. 2, is formed by a central paper layer of approximately 0.5 mm thick and two thin layers of coating or recto-verso overlays 18 and 20 made of paper or plastic such as polyester or polyvinyl chloride with a thickness ranging from 0.03 mm to 0.05 mm. The total thickness of the ticket body is generally between 0.560 mm and 0.640 mm or less.

The electronic module 14 which is located in a through-hole of the ticket body is sandwiched between the two layers of protective coating 18 and 20.

Figure 3:
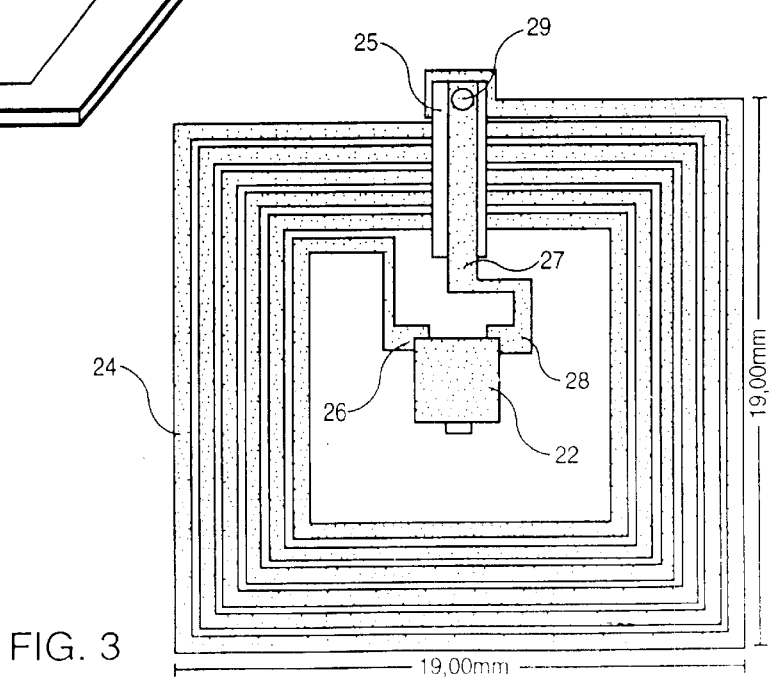
FIG. 3 represents the electronic module, built into the access ticket according to the invention.

This electronic module, illustrated in FIG. 3, mainly consists of a support made of paper or plastic material having a thickness between 0.08 mm and 0.15 mm on which an integrated circuit or chip 22 and an antenna 24 are located. The integrated circuit is designed to process the 13.56 MHz electromagnetic signal transmitted by the ticket reader and received by the antenna 24, and to transmit the information stored in the integrated circuit 22 and designed to order the access to the zone with controlled access by modulating an 847 kHz electromagnetic signal used as a carrier.

The antenna 24 is presented in the form of a square spiral measuring 19 mm per side and having at least one turn and preferably between 6 and 10 turns, the turns being square or circular, and has both of its ends connected to the integrated circuit 22 by means of connections 26 and 28. It should be noted that the inductance of the antenna 24 has a value such that it forms a resonating circuit with the integrated circuit's input condenser.

The fabrication of the antenna forms an important characteristic of the invention as it contributes to providing a less expensive ticket. This fabrication operation, which uses screen printing techniques, consists in printing the antenna turns on an electrically insulating substrate serving as the antenna support, preferably paper, but which may be a plastic material as stated previously, using an ink consisting of a fine silvery powder in a polymerisable composition and a solvent. After drying and heat treatment, the conductive spiral shown in FIG. 3, made of silver in a polymerized composition, is obtained. A layer of dielectric ink 25 is then printed perpendicularly to the turns. After heat treating this ink, a conductive band 27 is printed which is connected to the end 29 of the antenna and to the connection terminal 28 which ensures the electrical connection with the integrated circuit, the other connection being made on terminal 26. It should be noted that the width of the conductor forming the antenna 24, the distance between the turns and the number of turns define the inductance of the antenna.

The antennas may be manufactured in series using an antenna support band and by repeatedly performing the antenna printing operations described above. A chip is then installed in the center of each antenna in the manner shown in FIG. 3, the connection of the chip to the ends of the antenna being preferably made with conductive adhesive, while soldering can of course be used. The electronic modules may now be cut out.

Figure 4:
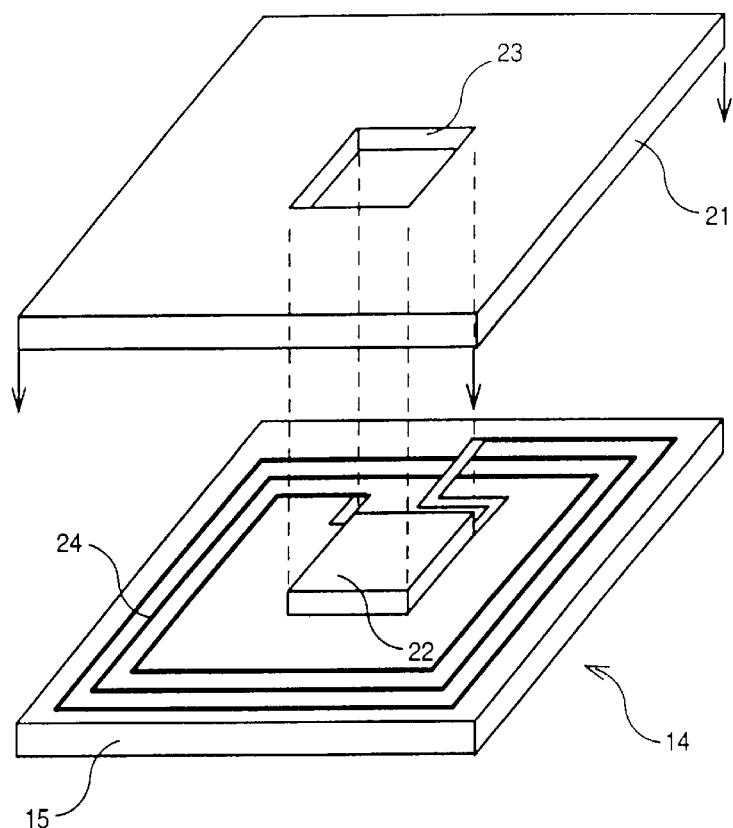
FIG. 4 represents a perspective view of the electronic module when the overlay is installed on said module, FIG. 5 schematically represents the ticket body multi-band formation step in compliance with the process according to the invention, and FIG. 6 schematically represents the formation step of a band of tickets equipped with bands of protective coating according to the process of the invention.

However, an important operation is carried out in the scope of the present invention, preferably prior to cutting out the electronic module. As shown in FIG. 4, each electronic module 14 consists of a support 15 on which an antenna 24 was screen printed and on which an integrated circuit or chip 22 was installed. While the thickness of the antenna is negligible, this is not the case for the chip 22 which has a certain thickness. This is why a paper or plastic material overlay 21 is installed on each module before or after cutting the band. This overlay has a thickness slightly greater than that of the chip and is provided with an opening 23 whose dimensions are slightly greater than that of the chip so that the latter fits into the hole. In this manner, when the overlay is installed, the thickness of the module is practically constant (except in the area where the chip thickness is slightly reduced) thereby avoiding a depression around the chip when the coating layer is applied.

Finally, an essential operation within the scope of the invention is performed. This step concerns a hot lamination operation which allows the antenna characteristics to be improved considerably. It is essential that the resistance of the antenna be reduced as much as possible so that the greatest possible intensity circulates in the antenna in order to obtain the highest transmission power possible using the inductance of the antenna. It has been noted that this reduction in resistance is obtained by applying a pressure between 20 and 120 kg/cm$^3$ and mainly by applying a temperature which is preferably between 80° and 170° C., which is carried out through the hot lamination operation.

Figure 5:
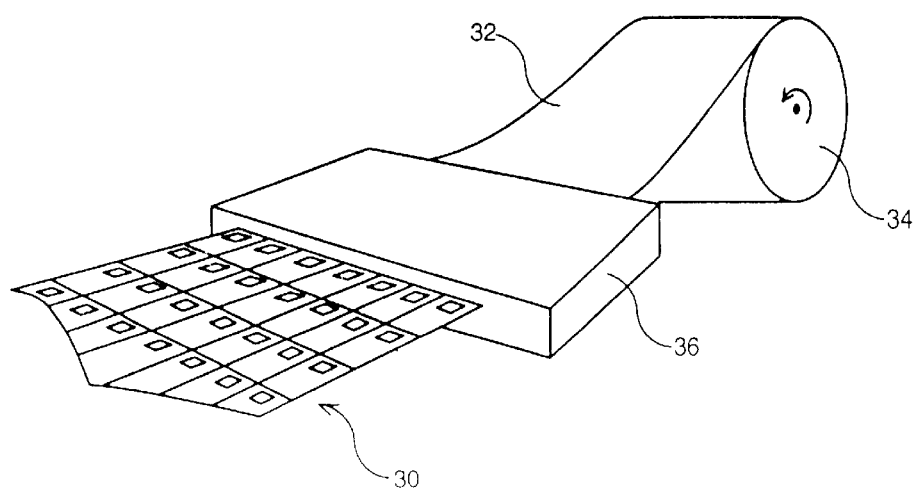

This ticket fabrication process starts by the formation of a strip or multi-band of ticket bodies 30 as shown in FIG. 5. To do this, a band of paper 32 of a given thickness and a width equal to 10 ticket widths (this width may be different) is unrolled from a reel 34 and passes into a forming station 36 where the paper band 32 is punched so as to form through-holes and designed to receive the electronic modules, then is printed on both sides, as required. The station 36 also slices the band 32 into 10 bands of one ticket in width which are then wound onto ticket reels (not shown).

Figure 6:
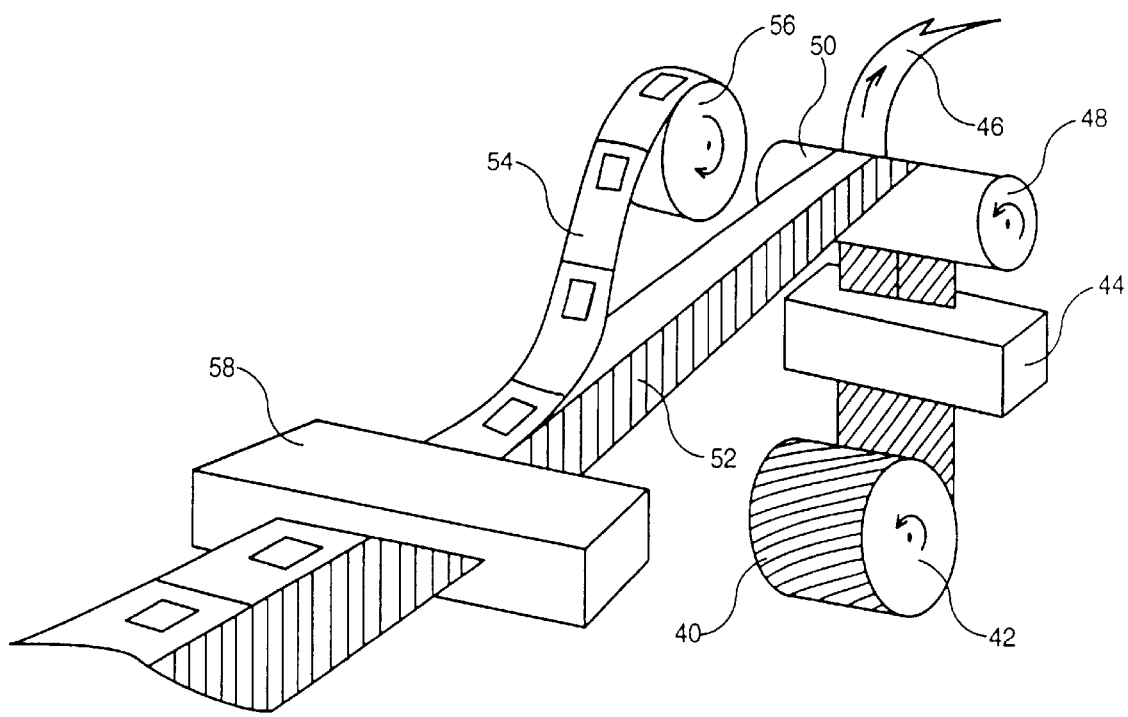

The following step, illustrated in FIG. 6, consists in applying the layers of protective coating or overlays. A strip 40 of paper or plastic material (polyester, polyvinyl chloride or other plastic material) is used as defined previously and supplied from a reel 42 and having a width which is double that of the tickets so as to be able to overlay the front and back of the ticket body. This band 40 supplied from the reel 42 is in fact made up of the overlay featuring an adhesive layer and a thin layer of backing paper.

The band 40 then passes into the slitting station 44 where the backing paper is slit so as to be able to remove one strip of backing paper 46 from half of the band 40 after passing over a roller 48. The overlay, from which the backing paper has been removed, thus has an adhesive face 50 while the adjacent band 52 remains protected by the backing paper. A band of ticket bodies 54 supplied from a reel 56 is then applied to the adhesive face 50.

The following operation consists in positioning the electronic modules, as they were manufactured in reference to FIG. 4, into the holes of the band of ticket bodies. It should be noted that the module is held in its hole by the layer of adhesive on the overlay strip 50. Furthermore, the electronic module fitted with its overlay is independent from the rest of the ticket and does not have a preferential positioning axis. It can thus be placed in its hole in any manner, that is in 8 possible positions. This capability is interesting insofar as it does not require an additional meticulous and thus costly module positioning process. Furthermore, securing the module by bonding is not essential.

Finally, the unexposed backing paper part 52 is folded over onto the band of ticket bodies 54 after the backing paper coating has been removed.

It should be noted that, while the process just described is preferred, two separate strips could be used as a protective coating instead of just one single strip that is folded over onto the ticket strip. Moreover, a bonding process could also be used in which the overlays are hot laminated onto the ticket body instead of using a simple adhesive bonding.

The contactless access ticket described above offers several noteworthy advantages. Firstly, it has a low cost price insofar as it implements an inexpensive fabrication process and uses materials which considerably reduce its cost in comparison with a smart card while presenting the same functionalities as the later. Additionally, it is biodegradable as it uses a paper support, and this is essential since this ticket is generally disposed of after the first use.

What is claimed is:

1. A ticket providing access to a zone with controlled access when said ticket is presented without contact in front of a ticket reader authorizing access to the zone, said ticket having an Edmonson format and comprising a paper ticket body covered on both surfaces with a protective coating, said paper ticket body being provided with a through-hole wherein is located an electronic module comprising an integrated circuit and an antenna, said antenna being formed by at least one turn obtained by screen printing with silvery powder in a polymerisable composition before being heat-cured, wherein said electronic module also includes an overlay having a thickness slightly greater than that of said electronic circuit and provided with an opening whose dimensions are slightly greater than that of said electronic circuit such that said electronic circuit fits into said opening, so that said module has a substantially constant thickness.

2. The ticket according to claim 1 in which said antenna is made up of a number of turns between 6 and 10.

3. The ticket according to claim 2 in which said antenna is formed by one or more square turns.

4. The ticket according to claim 1, in which said electronic module is comprised of a paper support on which the antenna is obtained by screen printing and said integrated circuit is fixed between the ends of said antenna by soldering or bonding by means of a conductive adhesive.

5. A ticket fabrication process according to claim 1 characterized in that said process comprises
   a) preparing a paper strip or multi-band having a width corresponding to several ticket widths,
   b) making holes which pass through said strip designed to receive the electronic modules of said tickets,
   c) slitting said strip into several single strips each corresponding to one reel of tickets, and
   d) placing consecutively, on each side of said strip with said holes, the first layer of protective coating, then the second layer of protective coating after having inserted the electronic modules in said holes according to the following procedure:
      bonding said single strip corresponding to a reel of tickets and arranging said holes, on said adhesive face,
      placing said electronic modules in said holes, said electronic modules being maintained in the holes by the adhesive of said first layer of protective coating, and
      covering said strip bonded to said first layer of protective coating with a second layer of protective coating having an adhesive face.

6. A ticket fabrication process for a ticket having an Edmonson format and comprising a paper ticket body covered on both surfaces with a protective coating, said paper ticket body being provided with a through-hole wherein is located an electronic module comprising an integrated circuit and an antenna, said antenna being formed by at least one turn obtained by screen printing with silvery powder in a polymerisable composition before being heat-cured, characterized in that said process comprises
   a) preparing a paper strip or multi-band having a width corresponding to several ticket widths,
   b) making holes which pass through said strip designed to receive the electronic modules of said tickets,
   c) slitting said strip into several single strips each corresponding to one reel of tickets, and
   d) placing consecutively, on each side of said strip with said holes, a first layer of protective coating, then a second layer of protective coating after having inserted the electronic modules in said holes wherein said step d) further comprises:
      d1) preparing a first protective coating strip having an adhesive on one side covered by backing paper,
      d2) removing said backing paper so as to uncover the adhesive face,
      d3) bonding said single strip corresponding to a reel of tickets and arranging said holes, on said adhesive face,
      d4) placing said electronic modules in said holes, said electronic modules being maintained in the holes by the adhesive of said first layer of protective coating, and
      d5) covering said strip bonded to said first layer of protective coating with a second layer of protective coating having an adhesive face.

7. The process according to claim 6 in which both layers of protective coating initially form a single band measuring the double width of said single strip corresponding to a reel of tickets and having an adhesive face covered with backing paper, a band of backing paper being initially removed from the part which will form the first layer of protective coating to affix said single strip and the backing paper then being entirely removed from said double width band so that it can be folded over and bonded onto said single strip and to serve as a second layer of protective coating for the latter after the electronic modules have been placed in said holes.

8. A ticket fabrication process for a ticket having an Edmonson format and comprising a paper ticket body covered on both surfaces with a protective coating, said paper ticket body being provided with a through-hole wherein is located an electronic module comprising an integrated circuit and an antenna, said antenna being formed by at least one turn obtained by screen printing with silvery powder in a polymerisable composition before being heat-cured, characterized in that said process comprises
   a) preparing a paper strip or multi-band having a width corresponding to several ticket widths,
   b) making holes which pass through said strip designed to receive the electronic modules of said tickets,
   c) slitting said strip into several single strips each corresponding to one reel of tickets, and
   d) placing consecutively, on each side of said strip with said holes, a first layer of protective coating, then a second layer of protective coating after having inserted the electronic modules in said holes, also including the following fabrication steps for electronic modules prior to placing the latter into said holes in step c):
      C1) screen printing of said antenna on a paper support,
      C2) placing said integrated circuit on said paper support while connecting said integrated circuit between the ends of said antenna by bonding or soldering,
      C3) installing an overlay onto said module, said overlay having the same thickness as said integrated circuit and featuring a through-hole at the location of said integrated circuit, and
      C4) proceeding with the hot lamination of said electronic module covered by said overlay so as to reduce the resistance of said antenna.

9. The process according to claim 8 in which the hot lamination step is performed at a pressure between 20 and 120 kg/cm$^3$ and at a temperature between 80 and 170° C.

* * * * *